US011978592B2

(12) United States Patent
Iguchi et al.

(10) Patent No.: US 11,978,592 B2
(45) Date of Patent: May 7, 2024

(54) DIELECTRIC COMPOSITION AND MULTILAYER CERAMIC ELECTRONIC DEVICE

(71) Applicant: TDK CORPORATION, Tokyo (JP)

(72) Inventors: Toshihiro Iguchi, Tokyo (JP); Yuichiro Sueda, Tokyo (JP); Ryota Namiki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 225 days.

(21) Appl. No.: 17/748,697

(22) Filed: May 19, 2022

(65) Prior Publication Data
US 2022/0384112 A1 Dec. 1, 2022

(30) Foreign Application Priority Data
May 26, 2021 (JP) .................. 2021-088541

(51) Int. Cl.
| | |
|---|---|
| H01G 4/008 | (2006.01) |
| C04B 35/468 | (2006.01) |
| H01G 4/012 | (2006.01) |
| H01G 4/12 | (2006.01) |
| H01G 4/30 | (2006.01) |

(52) U.S. Cl.
CPC ....... *H01G 4/1227* (2013.01); *C04B 35/4682* (2013.01); *H01G 4/008* (2013.01); *H01G 4/012* (2013.01); *H01G 4/30* (2013.01)

(58) Field of Classification Search
CPC ....... H01G 4/008; H01G 4/30; C04B 35/4682
See application file for complete search history.

(56) References Cited

U.S. PATENT DOCUMENTS

| | | | | |
|---|---|---|---|---|
| 7,323,428 B2 * | 1/2008 | Ito | ........................ | H01G 4/1218 |
| | | | | 501/138 |
| 9,440,885 B2 * | 9/2016 | Morigasaki | ......... | C04B 35/4682 |
| 2012/0162858 A1 * | 6/2012 | Tanaka | ................. | H01G 4/1227 |
| | | | | 361/321.4 |
| 2014/0296387 A1 * | 10/2014 | Matsukura | ............... | H01B 3/12 |
| | | | | 524/413 |
| 2015/0036262 A1 | 2/2015 | Kai et al. | | |
| 2019/0237264 A1 * | 8/2019 | Sakurai | ................ | H01G 4/1245 |
| 2020/0043657 A1 * | 2/2020 | Ariizumi | ............... | H01G 4/1218 |
| 2020/0075253 A1 | 3/2020 | Kang et al. | | |
| 2020/0286683 A1 | 9/2020 | Kang et al. | | |
| 2020/0411248 A1 * | 12/2020 | Hashimoto | ............ | H01G 4/008 |
| 2021/0142948 A1 | 5/2021 | Kang et al. | | |
| 2021/0202179 A1 * | 7/2021 | Saito | .................... | H01G 4/1218 |

FOREIGN PATENT DOCUMENTS

| | | |
|---|---|---|
| CN | 110880414 A | 3/2020 |
| JP | 2013-012418 A | 1/2013 |

OTHER PUBLICATIONS

A.C. Caballero et al. "Effect of Residual Phosphorus Left by Phosphate Ester on BaTiO3 Ceramics". Materials Research Bulletin, 1997, vol. 32, No. 2, pp. 221-229.

* cited by examiner

*Primary Examiner* — Sherman Ng
(74) *Attorney, Agent, or Firm* — Oliff PLC

(57) ABSTRACT

A dielectric composition includes dielectric particles and first segregations. The dielectric particles each include a perovskite compound represented by $ABO_3$ as a main component. The first segregations each include at least Ba, P, and O. A molar ratio (Ba/Ti) of Ba to Ti in the first segregations is 1.20 or more.

9 Claims, 2 Drawing Sheets

DIELECTRIC COMPOSITION AND MULTILAYER CERAMIC ELECTRONIC DEVICE

BACKGROUND OF THE INVENTION

Figure 1:
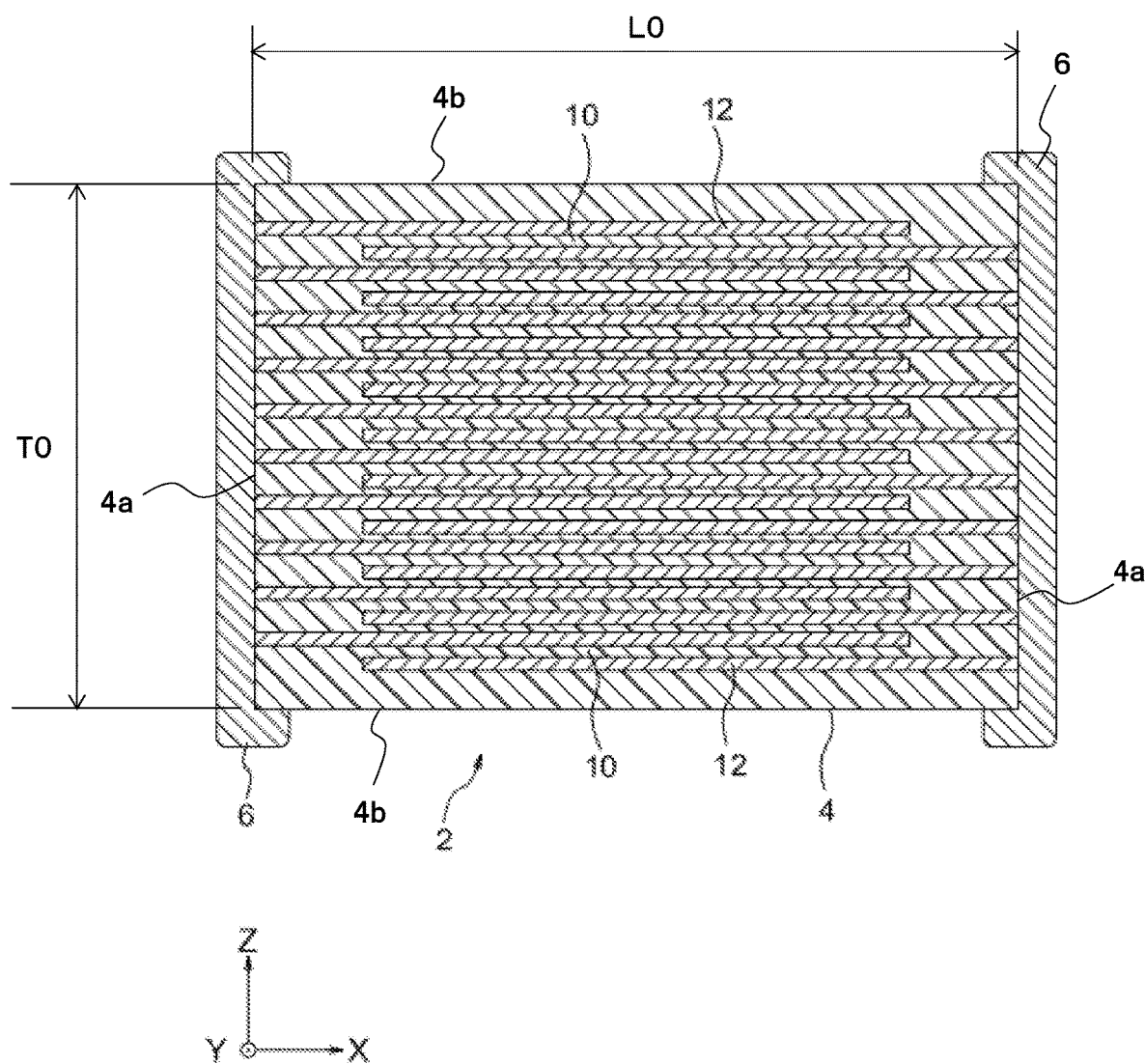

The present invention relates to a dielectric composition and a multilayer ceramic electronic device including the dielectric composition.

As shown in Patent Document 1, a multilayer ceramic electronic device formed by alternately laminating ceramic layers composed of a dielectric composition and internal electrode layers is known. The multilayer ceramic electronic device has differences in characteristics, such as shrinkage factor and linear expansion coefficient, between the ceramic layers and the internal electrode layers. In the ceramic layers composed of a dielectric composition, structural defects, such as cracks, are likely to occur due to the differences in characteristics, and the durability in a high-temperature and high-humidity environment may decrease.

Patent Document 1: JP2013012418 (A)

BRIEF SUMMARY OF THE INVENTION

The present invention has been achieved under such circumstances. It is an object of the present invention to provide a dielectric composition and a multilayer ceramic electronic device having an excellent durability for a high-temperature and high-humidity environment.

To achieve the above object, a dielectric composition according to the present invention comprises:

dielectric particles each including a perovskite compound represented by $ABO_3$ as a main component; and first segregations each including at least Ba, P, and O, wherein a molar ratio (Ba/Ti) of Ba to Ti in the first segregations is 1.20 or more.

The dielectric composition according to the present invention includes the first segregations having predetermined elements as mentioned above, and it is considered that the occurrence of cracks can be prevented by the first segregations. As a result, the dielectric composition according to the present invention and a multilayer ceramic electronic device including the dielectric composition exhibit an excellent durability for a high-temperature and high-humidity environment.

Preferably, a content rate of the first segregations is 0.007 pieces/$\mu m^2$ or more and 0.4 pieces/$\mu m^2$ or less.

Preferably, a molar ratio (P/Si) of P to Si in the first segregations is 2.5 or more.

Preferably, an average particle size of the first segregations is 0.05 $\mu m$ or more and 0.50 $\mu m$ or less.

Preferably, the dielectric composition further comprises second segregations each including at least Si, a rare earth element R, and O. In this case, preferably, the rare earth element R contained in the second segregations is Y and/or Dy. Preferably, N2/N1 is 0.5 or more and 10 or less, where N1 is a content rate of the first segregations (unit: pieces/$\mu m^2$), and N2 is a content rate of the second segregations (unit: pieces/$\mu m^2$).

Preferably, the perovskite compound comprises barium titanate.

BRIEF DESCRIPTION OF THE DRAWING(S)

Figure 2:
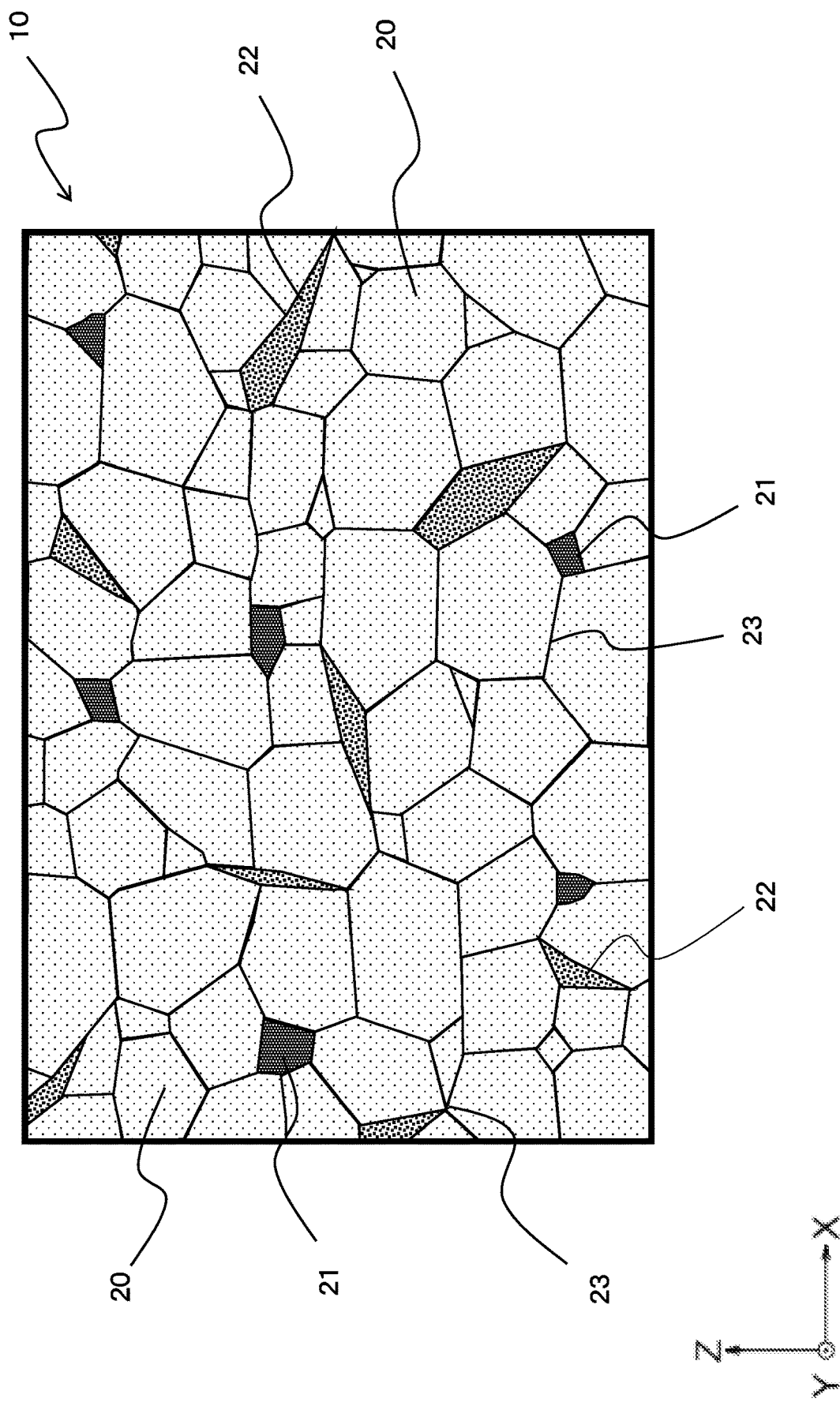

FIG. 1 is a schematic view illustrating a cross section of a multilayer ceramic capacitor according to an embodiment; and FIG. 2 is an enlarged cross-sectional view of ceramic layers 10 shown in FIG. 1.

DETAILED DESCRIPTION OF THE INVENTION

In the present embodiment, a multilayer ceramic capacitor 2 shown in FIG. 1 is described as an example of a ceramic electronic device according to the present invention. The multilayer ceramic capacitor 2 includes an element body 4 and a pair of external electrodes 6 formed on the external surface of the element body 4.

The element body 4 shown in FIG. 1 normally has a substantially rectangular parallelepiped shape and includes two end surfaces 4a facing each other in the X-axis direction, two side surfaces 4b facing each other in the Y-axis direction, and two side surfaces 4b facing each other in the Z-axis direction, but the element body 4 may have any other shape, such as elliptical columnar shape, columnar shape, and prismatic shape. The element body 4 has any outer size and can have, for example, a length L0 of 0.4-5.7 mm in the X-axis direction, a width W0 of 0.2-5.0 mm in the Y-axis direction, and a height T0 of 0.2-3.0 mm in the Z-axis direction. In the present embodiment, the X-axis, the Y-axis, and the Z-axis are perpendicular to each other.

The element body 4 includes ceramic layers 10 and internal electrode layers 12 substantially parallel to the plane including the X-axis and the Y-axis. In the inside of the element body 4, the ceramic layers 10 and the internal electrode layers 12 are laminated alternately along the Z-axis direction. Here, "substantially parallel" means that most parts are parallel, but there may be a part that is not slightly parallel, and the ceramic layers 10 and the internal electrode layers 12 may slightly be uneven or inclined.

The ceramic layers 10 are made of a dielectric composition mentioned below. The average thickness (interlayer thickness) per layer of the ceramic layers 10 is not limited and can be, for example, 100 $\mu m$ or less (preferably, 30 $\mu m$ or less). The lamination number of ceramic layers 10 is determined based on desired characteristics and is not limited. For example, the lamination number of ceramic layers 10 can be 20 or more, preferably 50 or more.

Meanwhile, the internal electrode layers 12 are laminated between the ceramic layers 10 and the lamination number of internal electrode layers 12 is determined based on the lamination number of ceramic layers 10. The average thickness per layer of the internal electrode layers 12 is not limited and can be, for example, 3.0 $\mu m$ or less. The average thickness of the ceramic layers 10 and the average thickness of the internal electrode layers 12 are calculated by observing a cross section as shown in FIG. 1 using a metallurgical microscope and measuring the thickness of each layer (10, 12) at five points or more.

The internal electrode layers 12 are laminated so that their ends on one side are alternately exposed to two end surfaces 4a of the element body 4 facing each other in the X-axis direction. Then, the pair of external electrodes 6 is formed on the end surfaces 4a of the element body 4 and electrically connected to the exposed ends of the internal electrode layers 12 alternately arranged. Since the internal electrode layers 12 and the external electrodes 6 are formed in such a manner, a capacitor circuit is formed by the external electrodes 6 and the internal electrode layers 12. That is, the ceramic layers 10 existing in the capacitance region are sandwiched by the internal electrode layers 12 having different polarities, and voltage can be applied to the ceramic layers 10.

The internal electrode layers 12 are made of a conductive material and preferably include Ni as a main component. Specifically, preferably, the conductive material of the internal electrode layers 12 is pure Ni or a Ni based alloy containing Ni by 85 wt % or more. The Ni based alloy may include one or more elements selected from Mn, Cu, Cr, etc. In addition to the conductive material, as an inhibitor, the internal electrode layers 12 may contain particles of a perovskite compound having the same composition as the main component of the ceramic layers 10. In addition, the internal electrode layers 12 may contain a trace amount (e.g., about 0.1 mass % or less) of non-metal elements, such as S and P, and may contain voids. When the internal electrode layers 12 contain an inhibitor, voids, or the like, the internal electrode layers 12 may have disconnected parts where an electrode (conductive material) is not present.

The pair of external electrodes 6 can include a baked electrode layer, a resin electrode layer, a plating electrode layer, or the like and may be composed of a single electrode layer or a plurality of laminated electrode layers. For example, the external electrode 6 can have a triple-layer structure of a baked electrode layer—a Ni plating layer—a Sn plating layer (laminated in this order). In this case, the Sn plating layer is located on the outermost surface of the external electrode 6, and the solder wettability of the external electrode 6 is thus favorable.

As shown in FIG. 1, each of the external electrodes 6 integrally includes an end surface part formed on the end surface 4a of the element body 4 and extension parts formed at an end in the X-axis direction on each of the side surfaces 4b of the element body 4. That is, each of the external electrodes 6 is formed so as to range from the end surface 4a to the side surfaces 4b of the element body 4. The external electrodes 6 are insulated so as not to contact with each other in the X-axis direction.

Note that, the extension parts of the external electrodes 6 are not necessarily formed, and each of the external electrodes 6 may be formed from only the end surface part. Instead, when the multilayer ceramic capacitor 2 is surface-mounted on a substrate, the extension parts of the external electrodes 6 are formed at least on the side surface 4b facing a mounting surface of the substrate and are not necessarily formed on the side surface 4b opposite to the mounting surface.

Next, a dielectric composition of the ceramic layers 10 is explained in detail.

The dielectric composition of the ceramic layers 10 includes a perovskite compound represented by a general formula of $ABO_3$ as a main component. Here, the main component of the ceramic layers 10 (the main component of the dielectric composition) means a component occupying 80 mol % or more of the ceramic layers 10. In the present embodiment, the perovskite compound (main component) is preferably barium titanate (BT). This barium titanate may be represented by a composition formula of $(Ba_{(1-a-b)}Sr_aCa_b)_m(Ti_{(1-c-d)}Zr_cHf_d)O_3$.

In the composition formula, each of a, b, c, d, and m is an elemental ratio, and each elemental ratio is not limited and can be determined within a known range. For example, "m" indicates an elemental ratio of the A-site to the B-site and can normally be 1.0-1.1. "a" indicates an elemental ratio of Sr in the A-site, and "b" indicates an elemental ratio of Ca in the A-site. In the present embodiment, $0 \leq a+b \leq 0.1$ is preferably satisfied. "c" indicates an elemental ratio of Zr in the B-site, and "d" indicates an elemental ratio of Hf in the B-site. In the present embodiment, $0 \leq c+d \leq 0.15$ is preferably satisfied. The elemental ratio of oxygen (O) in the above-mentioned composition formula may slightly deviate from the stoichiometric composition.

In addition to the above-mentioned main component, the ceramic layers 10 may include sub-components, such as Mn compounds, Mg compounds, Cr compounds, Ni compounds, rare earth element compounds, Si compounds, Li compounds, B compounds, V compounds, Al compounds, Ca compounds, and Zr compounds. There is no limit to the type, combination, or addition amount of the sub-components.

The component compositions of the ceramic layers 10 and the internal electrode layers 12 are analyzed by inductively coupled plasma emission spectroscopy (ICP), laser ablation ICP mass analysis (LA-ICP-MS), fluorescent X-ray analysis (XRF), energy dispersive X-ray analysis (EDX), electron beam microanalyzer (EPMA) equipped with wavelength dispersive X-ray spectroscope (WDS), or the like.

The ceramic layers 10 containing the above-mentioned components have an internal texture as shown in FIG. 2 and include dielectric particles 20 (parent phases), segregation phases (21, 22) having predetermined characteristics, and grain boundaries 23 located between the dielectric particles 20.

The dielectric particles 20 are composed of the main component (perovskite compound) of the ceramic layers 10 mentioned above. In addition to the main component, when the ceramic layers 10 include sub-components, the sub-components may be solid-soluted in the dielectric particles 20. The dielectric particles 20 may have a core-shell structure by solid solution of the sub-components. The dielectric particles 20 can have an average particle size of 2.0 μm or less and preferably have an average particle size of 0.1 μm to 1.0 μm.

An average particle size of the dielectric particles 20 can be measured by observing a cross section of the ceramic layers 10 as shown in FIG. 2 using a scanning electron microscope (SEM), a scanning transmission electron microscope (STEM), or the like and performing an image analysis of the obtained cross-sectional photograph. For example, an average particle size of the dielectric particles 20 is calculated by measuring equivalent circle diameters of at least 100 or more dielectric particles 20.

As shown in FIG. 2, the ceramic layers 10 according to the present embodiment include first segregations 21. The first segregations 21 are phases of a composite oxide whose concentration of P is higher than that in the dielectric particles 20 and include at least P (phosphorus), Ba, and O (oxygen). In addition to the above-mentioned elements, the first segregations 21 may include constituent elements of the ceramic layers 10 (elements that can be contained in the main component, such as Sr, Ca, Ti, Zr, and Hf, sub-component elements, etc.). Assuming that the total content of elements excluding oxygen contained in the first segregations 21 is 100 mol, a content rate of P in the first segregations 21 is preferably 1 mol % or more and is more preferably 3 mol % to 40 mol %.

The first segregations 21 have a predetermined elemental proportion. In the first segregations 21, specifically, a molar ratio of Ba to Ti (hereinafter, referred to as a Ba/Ti ratio) is higher than a Ba/Ti ratio in the dielectric particles 20 and is 1.20 or more. When a Ba/Ti ratio in the first segregations 21 is higher than that in the dielectric particles 20, Ba is considered to exist in the first segregations 21. The Ba/Ti ratio in the first segregations 21 has no upper limit. The first segregations 21 may not include Ti. Since segregation phases of Ba and P (first segregations 21) exist in the ceramic layers 10, the multilayer ceramic capacitor 2 according to the present embodiment exhibits an excellent durability for a high-temperature and high-humidity environment.

In addition, as mentioned above, the ceramic layers 10 may include a Si compound as a sub-component, and the first segregations 21 may include Si added as the sub-component. Preferably, however, a Si content rate is lower than a P content rate in the first segregations 21. A molar ratio of P to Si (hereinafter, referred to as a P/Si ratio) in the first segregations 21 is preferably 2.5 or more and is more preferably 3.0 or more. When a P/Si ratio is within the above-mentioned range, the durability for a high-temperature and high-humidity environment is further improved. The first segregations 21 may not include Si. The P/Si ratio has no upper limit.

The detailed composition of the first segregations 21 is not limited, but the crystal system of the first segregations 21 is preferably a trigonal system. Examples of trigonal composite oxides include $Ba_3(PO_4)_2$. When the first segregations 21 are a trigonal composite oxide as mentioned above, the durability for a high-temperature and high-humidity environment can be further improved.

In the present embodiment, the first segregations 21 are preferably determined by a combination of mapping analysis and point analysis with EDX or WDS. For example, in a cross section of the ceramic layers 10 as shown in FIG. 2, a mapping analysis is performed to determine regions where P is segregated from a P mapping image. Here, the "regions where P is segregated" means regions whose P concentration is higher than that in the dielectric particles 20 and can be visually determined from the P mapping image. A point analysis is performed in each of the regions where P is segregated so as to measure a Ba/Ti ratio in each of the segregation regions. When the Ba/Ti ratio is 1.20 or more, the measured P segregation regions are considered to be the first segregations 21. The measurement conditions, such as measurement visual field and resolution, in the mapping analysis and the point analysis are not limited and appropriately determined so that segregation analysis can be performed.

The first segregations 21 can have an average particle size of 1.0 μm or less and preferably have an average particle size of 0.05 μm or more and 0.50 μm or less. The average particle size of the first segregations 21 is calculated by determining at least five segregations 22 with EDX or WDS and thereafter measuring equivalent circle diameters of the determined segregations 21 with image analysis.

In the present embodiment, the number N1 (unit: pieces/$\mu m^2$) of first segregations 21 contained in a unit cross-sectional area of the ceramic layers 10 is defined as the content rate of the first segregations 21 in the ceramic layers 10. The number N1 can be in the range of 0.005 pieces/$\mu m^2$ to 0.5 pieces/$\mu m^2$ and is preferably 0.007 pieces/$\mu m^2$ or more. Considering the influence of the first segregations 21 on the relative permittivity, the number N1 is preferably 0.4 pieces/$\mu m^2$ or less. When the number N1 is in the range of 0.007 to 0.4 pieces/$\mu m^2$, the improvement in the durability for a high-temperature and high-humidity environment and a high relative permittivity can be achieved at the same time.

The number N1 is calculated by observing a cross section of the ceramic layers 10 as shown in FIG. 2 in a plurality of visual fields with SEM or STEM and measuring the number of first segregations 21 existing in the cross section of at least 1000 $\mu m^2$ or more in total.

In addition to the first segregations 21, preferably, the ceramic layers 10 according to the present embodiment include second segregations 22 having predetermined characteristics. The second segregations 22 are phases of a composite oxide including at least Si, a rare earth element R, and O. A total content of Si and the rare earth element R in the second segregations 22 is higher than that in the dielectric particles 20. Preferably, the rare earth element R contained in the second segregations 22 is Y (yttrium) and/or Dy (dysprosium). When the R—Si—O based second segregations 22 are present in the ceramic layers 10, the ceramic layers 10 have a high sintering density, and the durability for a high-temperature and high-humidity environment can be further improved.

In addition to the above-mentioned elements, the second segregations 22 may include constituent elements of the ceramic layers 10. In particular, preferably, the second segregations include Ba. When the second segregations 22 include Ba, a Ba/Ti ratio in the second segregations 22 is preferably higher than that in the dielectric particles 20 and is more preferably 1.20 or more. The detailed composition of the second segregations 22 is not limited and can be, for example, $Ba_5Dy_{13}Si_8O_{41}$ (tetragonal). The inclusion of Ba in the second segregations 22 further increases the joint strength among the dielectric particles 20 and can further improve the durability for a high-temperature and high-humidity environment.

The second segregations 22 can be determined by a mapping analysis with EDX or WDS. At this time, the mapping analysis is performed in the same manner as the analysis of the first segregations 21. Then, overlapping regions of the Si segregation regions and the R segregation regions are extracted from a mapping image of Si and a mapping image of the rare earth element R obtained by the mapping analysis and are determined as the second segregations 22.

The second segregations 22 can have an average particle size of 2 μm or less and preferably have an average particle size of 0.05 μm to 1 μm. The average particle size of the second segregations 22 is measured in the same manner as that of the first segregations 21. That is, the average particle size of the second segregations 22 is calculated by determining at least five second segregations 22 in the above-mentioned manner and thereafter measuring equivalent circle diameters of the second segregations 22 with image analysis.

As with the first segregations 21, the number N2 (unit: pieces/$\mu m^2$) of second segregations 22 contained in a unit cross-sectional area of the ceramic layers 10 is defined as the content rate of the second segregations 22 in the ceramic layers 10 and is measured in the same manner as the number N1. In the present embodiment, preferably, the content rate of the second segregations 22 (number N2) is determined in consideration of the content rate of the first segregations 21 (number N1). Specifically, a ratio of N2 to N1 (N2/N1) can be in the range of 0.1 to 30 and is preferably in the range of 0.5 to 10. When the second segregations 22 are contained so as to satisfy this condition, a further improvement in the durability for a high-temperature and high-humidity environment and a high relative permittivity can be achieved at the same time.

As shown in FIG. 2, the second segregations 22 are preferably an acicular crystal, and an aspect ratio of the second segregations 22 is preferably larger than that of the first segregations 21. The aspect ratio of each segregation phase can be measured by image analysis of a cross section of the ceramic layers 10 as shown in FIG. 2 and can be represented as a ratio of a maximum width in the longitudinal direction to a maximum width in the lateral direction in each segregation phase.

As mentioned above, the ceramic layers 10 (dielectric composition) according to the present embodiment include predetermined segregation phases (21, 22), and the durability of the multilayer ceramic capacitor 2 can be improved by the segregation phases. In addition to the above-mentioned segregation phases, the ceramic layers 10 may include other segregation phases, voids, and the like. The grain boundaries 23 existing between the dielectric particles 20 are made of constituent elements of the main component and sub-component elements. Other segregation phases may be present in the grain boundaries 23.

Next, a method of manufacturing the multilayer ceramic capacitor 2 shown in FIG. 1 is explained.

First, a manufacturing process of the element body 4 is explained. In the manufacturing process of the element body 4, a dielectric paste to be the ceramic layers 10 after firing and an internal-electrode paste to be the internal electrode layers 12 after firing are prepared.

The dielectric paste is produced by using a powder of a perovskite compound, which is a main component of a dielectric composition (hereinafter, referred to as a main component powder), and a first-segregation powder to be the first segregations 21 after firing. The main component powder can be produced by a solid phase method, a hydrothermal synthesis method, an oxalate method, or the like. In the solid phase method, for example, a main component powder of barium titanate is obtained by uniformly mixing starting raw materials of $BaCO_3$ powder, $TiO_2$ powder, and the like, for example, in a wet mixing manner and thereafter performing a calcining treatment. At this time, the calcined main component powder may be appropriately pulverized, classified, or the like.

The first-segregation powder is obtained by mixing a compound powder containing Ba (e.g., $BaCO_3$ powder), a compound containing P (e.g., liquid phosphoric acid ($H_3PO_4$)), and the like at a predetermined proportion and performing a calcining treatment. In the preparation for the first-segregation powder, for example, a pulverization treatment is preferably appropriately performed so as to adjust the particle sizes of the first segregations 21.

When the second segregations 22 are formed in the ceramic layers 10, a second-segregation powder may be prepared. As with the first-segregation powder, the second-segregation powder can be produced using a compound powder containing a rare earth element R and a compound powder containing Si. The second segregations 22 may be formed by a blending proportion of sub-component raw materials without preparing a second-segregation powder.

Next, the main component powder and the first-segregation powder are added to an organic vehicle and kneaded to obtain the dielectric paste. Here, the organic vehicle is a binder dissolved in an organic solvent. The binder to be used is not limited and is appropriately selected from various binders of polyvinyl butyral, acrylic, ethyl cellulose, and the like. The organic solvent to be used is not limited and is appropriately selected from various organic solvents of methyl ethyl ketone, methanol, ethanol, acetone, toluene, terpineol, butyl carbitol, and the like.

The above-mentioned dielectric paste is an organic paint, but the dielectric paste may be a water based paint obtained by kneading a mixed powder and a water based vehicle. In this case, the water based vehicle is produced by dissolving a water-soluble binder, a dispersant, and the like in water. The water-soluble binder to be used is not limited and can be, for example, polyvinyl alcohol, water-soluble acrylic resin, water-soluble polyvinyl butyral resin, or the like. At this time, the second-segregation powder, sub-component raw materials, and the like are added appropriately. If necessary, the dielectric paste may contain additives selected from the above-mentioned second-segregation powder, various dispersants, plasticizers, dielectrics, sub-component compounds, and glass frits.

Meanwhile, an internal-electrode paste is produced by kneading a conductive material, such as pure Ni powder and Ni alloy powder, or a compound to be the above-mentioned Ni or Ni alloys after main firing, such as various oxides, organometallic compounds, and resinate, along with the organic vehicle as mentioned above. At this time, as an inhibitor, the main component powder contained in the dielectric paste may be added to the internal-electrode paste. The inhibitor exhibits a reduction effect on the sintering of the conductive powder in the firing step.

Next, the dielectric paste is turned into sheets by, for example, a doctor blade method to obtain ceramic green sheets. Then, the internal-electrode paste is applied onto the ceramic green sheets in a predetermined pattern by various printing methods, such as screen printing, or a transfer method. Moreover, the green sheets with the internal electrode patterns are laminated and thereafter pressed in the lamination direction to obtain a mother laminated body. At this time, the ceramic green sheets and the internal electrode patterns are laminated so that the ceramic green sheets are located on the upper surface and the lower surface of the mother laminated body in the lamination direction.

The mother laminated body obtained by the above-mentioned process is cut into a predetermined size by dicing or push-cutting to obtain a plurality of green chips. If necessary, the green chips may be solidified and dried so as to remove the plasticizer and the like and may be subjected to a barrel polishing using a horizontal centrifugal barrel machine or the like after the solidification and drying. In the barrel polishing, the green chips are put into a barrel container together with a medium and a polishing liquid, and a rotational movement or vibration is applied to the barrel container. Due to this barrel polishing, unnecessary parts, such as burrs, generated during the cutting are polished, and the corners of the green chips become rounded (corner R). The green chips after the barrel polishing are washed with a cleaning solution, such as water, and dried.

Next, the green chips obtained above are subjected to a binder removal treatment and a firing treatment to obtain the element body 4.

The conditions for the binder removal treatment are not limited and are appropriately determined based on the main component composition of the ceramic layers 10 and the main component composition of the internal electrode layers 12. For example, the heating rate is preferably 5-300° C./hour, the holding temperature is preferably 180-400° C., and the temperature holding time is preferably 0.5-24 hours. The binder removal atmosphere is the air or a reducing atmosphere.

The conditions for the firing treatment are not limited and are appropriately determined based on the main component composition of the ceramic layers 10 and the main component composition of the internal electrode layers 12. For example, the holding temperature during firing is preferably 1200-1350° C. and is more preferably 1220-1300° C., and the holding time is preferably 0.5-8 hours and is more preferably 1-3 hours. The firing atmosphere is preferably a reducing atmosphere, and for example, a mixed gas of $N_2$ and $H_2$ can be humidified and used as the atmospheric gas. When the internal electrode layers 12 are made of a base metal of Ni, Ni alloy, etc., the oxygen partial pressure in the firing atmosphere is preferably $1.0 \times 10^{-14}$ to $1.0 \times 10^{-10}$ MPa.

After the firing treatment, if necessary, an annealing may be performed. The annealing is a treatment for reoxidizing the ceramic layers 10. When the firing treatment is carried out in a reducing atmosphere, the annealing is preferably performed. The conditions for the annealing treatment are not limited and are also appropriately determined based on the main component composition of the ceramic layers 10 and the like. For example, the holding temperature is preferably 950-1150° C., the temperature holding time is preferably 0-20 hours, and the heating rate and the cooling rate are preferably 50-500° C./hour. Preferably, a humidified $N_2$ gas or the like is used as the atmospheric gas, and the oxygen partial pressure in the annealing atmosphere is $1.0 \times 10^{-9}$ to $1.0 \times 10^{-5}$ MPa.

In the above-mentioned binder removal treatment, firing treatment, and annealing treatment, for example, a wetter is used to humidify the $N_2$ gas, the mixed gas, and the like. In this case, the water temperature is preferably about 5-75° C. The binder removal treatment, the firing treatment, and the annealing treatment may be performed continuously or independently.

Next, a pair of external electrodes 6 is formed on the outer surface of the element body 4 obtained above. The external electrodes 6 are formed by any method. For example, when baked electrodes are formed as the external electrodes 6, a conductive paste containing glass frits is applied to the end surfaces of the element body 4 by a dip method, and the element body 4 is thereafter heated at a predetermined temperature. When resin electrodes are formed as the external electrodes 6, a conductive paste containing a thermosetting resin is applied to the end surfaces of the element body 4, and the element body 4 is thereafter heated at a temperature at which the thermosetting resin is cured. After the baked electrodes or the resin electrodes are formed in the above-mentioned manner, sputtering, vapor deposition, electrolytic plating, electroless plating, or the like may be performed so as to form the external electrodes 6 having a multilayer structure.

After the above-mentioned process, the multilayer ceramic capacitor 2 including the external electrodes 6 is obtained.

Summary of Embodiment

The multilayer ceramic capacitor 2 according to the present embodiment includes the element body 4 formed by alternately laminating the ceramic layers 10 composed of a predetermined dielectric composition and the internal electrode layers 12. Then, the dielectric composition of the ceramic layers 10 includes: the dielectric particles 20 containing the perovskite compound as a main component; and the first segregations 21 containing at least P, Ba, and O. Moreover, a Ba/Ti ratio (molar ratio) in the first segregations 21 is 1.20 or more.

Since the multilayer ceramic capacitor 2 has the above-mentioned characteristics, the insulation resistance is less likely to decrease in a high-temperature and high-humidity environment, and the durability for a high-temperature and high-humidity environment is improved. The reason why the durability is improved is not necessarily clear, but it is considered that the improvement in durability is due to the improvement in joint strength between the dielectric particles by the first segregations 21 containing predetermined elements.

Generally, material characteristics, such as shrinkage rate and linear expansion coefficient, are different from each other between ceramic layers composed of dielectric ceramics and internal electrode layers composed Ni, and stress is generated inside the ceramic layers due to the difference in the characteristics. Thus, if a load, such as external force and thermal effect, is applied to the element body, cracks are considered to occur inside the ceramic layers and cause deterioration in insulation characteristics and durability. In the multilayer ceramic capacitor 2 according to the present embodiment, the first segregations 21 are considered to make it easier to cause mutual diffusion of constituent elements between adjacent dielectric particles and improve the joint strength between the dielectric particles. Even if a crack starting point is generated inside the ceramic layers 10, it is considered that the crack growth can be prevented by the first segregations 21. As a result, the occurrence of cracks in the ceramic layers 10 can be prevented, and the multilayer ceramic capacitor 2 according to the present embodiment exhibits an excellent durability for a high-temperature and high-humidity environment.

In particular, the durability for a high-temperature and high-humidity environment can be further improved by controlling a P/Si ratio, an average particle size, and a content rate (number N1) in the first segregations 21 in a predetermined range.

Moreover, the ceramic layers 10 (dielectric composition) include the second segregations 22 containing at least a rare earth element (preferably, Y and/or Dy), Si, and O. The second segregations 22 can increase the sintering density of the ceramic layers 10. As a result, the durability for a high-temperature and high-humidity environment is further improved.

Hereinbefore, an embodiment of the present disclosure is explained, but the present invention is not limited to the above-mentioned embodiment and can be modified variously without departing from the gist of the present invention.

In the present embodiment, for example, the multilayer ceramic capacitor 2 is exemplified as the multilayer ceramic electronic device, but the multilayer ceramic electronic device of the present invention may be, for example, bandpass filters, multilayer three-terminal filters, piezoelectric elements, thermistors, varistors, or the like.

In the present embodiment, the ceramic layers 10 and the internal electrode layers 12 are laminated in the Z-axis direction, but the lamination direction may be the X-axis direction or the Y-axis direction. In that case, the external electrodes 6 are formed according to the exposed surfaces of the internal electrode layers 12. The internal electrode layers 12 may be drawn out to the outer surface of the element body 4 via through-hole electrodes. In this case, the through-hole electrodes and the external electrodes 6 are electrically connected to each other.

EXAMPLES

Hereinafter, the present disclosure is explained in more detail with examples of the present invention, but the present invention is not limited to the examples.

Experiment 1

In Experiment 1, capacitor samples according to Examples 1-4 were manufactured in the following manner.

First, a main component powder (a raw material of a dielectric paste) and a first-segregation powder were prepared. Specifically, the main component powder according to Examples 1-4 was a barium titanate powder ($BaTiO_3$ powder) obtained by hydrothermal synthesis. Meanwhile, the first-segregation powder was obtained by mixing raw material powders of liquid phosphoric acid ($H_3PO_4$), $BaCO_3$ powder, and the like in wet manner at a predetermined proportion, calcining the mixture, and pulverizing it in a ball mill. In Examples 1-4, the raw materials of the first-segregation powder were mixed at different blending proportions, and a Ba/Ti ratio and a P/Si ratio in the first segregations 21 were controlled by the blending proportion of the raw materials.

Next, the main component powder, the first-segregation powder, an organic vehicle, and sub-component powders ($Dy_2O_3$ powder, $MgCO_3$ powder, $Al_2O_3$ powder, $MnCO_3$ powder, and $V_2O_5$ powder) were kneaded to obtain a dielectric paste. At this time, the addition amount of the first-segregation powder in the dielectric paste was common in Examples 1-4. Moreover, a Ni powder, a barium titanate powder (inhibitor), and an organic vehicle were kneaded to obtain an internal-electrode paste.

Next, green chips were manufactured by a sheet method using the dielectric paste and the internal-electrode paste mentioned above. Then, the green chips were subjected to a binder removal treatment, a firing treatment, and an annealing treatment to obtain an element body 4 having a size of L0×W0×T0=2.0 mm×1.25 mm×1.25 mm. In the element body 4, the lamination number of ceramic layers 10 sandwiched by the internal electrode layers 12 was 77, the average thickness of the ceramic layers 10 was 9.6 μm, and the average thickness of the internal electrode layers 12 was 1.4 μm.

Next, a baked electrode layer containing Cu, a Ni plating layer, a Sn plating layer were formed in this order on the outer surface of the element body 4 mentioned above. After the above-mentioned process, the capacitor samples according to Examples 1-4 were obtained.

In Experiment 1, capacitor samples according to Comparative Examples 1 and 2 were obtained in the following manner.

Comparative Example 1

In Comparative Example 1, a dielectric paste was prepared without using a first-segregation powder. That is, the dielectric paste according to Comparative Example 1 was prepared by mixing a main component powder (barium titanate powder), a sub-component powder (the same sub-component as in Example 1), and an organic vehicle. Except for the above, the experimental conditions according to Comparative Example 1 were the same as those in Example 1, and capacitor samples according to Comparative Example 1 were obtained.

Comparative Example 2

In Comparative Example 2, a dielectric paste was obtained by mixing a main component powder (barium titanate powder), a liquid phosphoric acid, a sub-component powder (the same sub-component as in Example 1), and an organic vehicle. That is, in Comparative Example 2, the dielectric paste was prepared using the liquid phosphoric instead of a first-segregation powder. Except for the above, the experimental conditions according to Comparative Example 2 were the same as those in Example 1, and capacitor samples according to Comparative Example 2 were obtained.

The capacitor samples according to each Example and each Comparative Example manufactured in Experiment 1 were subjected to the following evaluations.

Analysis of Segregations

In Experiment 1, segregation phases existing inside the ceramic layers 10 were determined by observing a cross section of each capacitor sample with STEM and performing a mapping analysis and a point analysis with EDX at that time. Table 1 shows the measurement results in each Example and each Comparative Example. In Comparative Example 1, a segregation phase containing P was not confirmed, and "–" is thus written in the segregation results of Comparative Example 1 in Table 1. In Comparative Example 2 and Example 1, Si was not substantially detected at P segregation parts (specifically, the Si content was 1 mol % or less, assuming that the total content of elements excluding oxygen was 100 mol), "–" is thus written in the columns of P/Si ratio in Comparative Example 2 and Example 1.

Durability Evaluation

A pressure cooker bias test (PCBT) was performed so as to evaluate the durability of the capacitor samples for a high-temperature and high-humidity environment. Specifically, the capacitor samples were exposed for a long time to an environment of temperature: 121° C., humidity: 95%, and atmospheric pressure: $2.026 \times 10^5$ Pa while voltage (100V) was being applied to the capacitor samples. The exposure time was 24 hours in Condition 1 and 240 hours in Condition 2 for evaluation of the durability under stricter conditions than Condition 1. Then, an insulation resistance of the capacitor samples was measured before and after the PCBT, and the sample in which the insulation resistance after the PCBT was reduced to 1/10 or less of the insulation resistance before the test was considered to be failed (NG). The number of test samples in Condition 1 was 80, and the number of test samples in Condition 2 was 400. A NG rate (number of NG samples/number of test samples (80 or 400)) in each Example and each Comparative Example was calculated. The NG rate in Condition 1 (PCBT 24 hours): 0/80 was used as a pass/fail criterion for durability. The lower the NG rate in Condition 2 was, the better the durability was considered to be. The evaluation results of Experiment 1 are shown in Table 1.

TABLE 1

| | Analysis Results of Segregation Phases | | | Evaluation Results of PCBT | |
|---|---|---|---|---|---|
| | | | | Condition 1: 24 hours | Condition 2: 240 hours |
| Sample No. | Composition Type | Ba/Ti Ratio | P/Si Ratio | NG Rate (NG Number/ Test Number) | NG Rate (NG Number/ Test Number) |
| Comp. Ex. 1 | — | — | — | 5/80 | 45/400 |
| Comp. Ex. 2 | Ba—P—O | 1.04 | — | 6/80 | 42/400 |

TABLE 1-continued

| | Analysis Results of Segregation Phases | | | Evaluation Results of PCBT | |
| | | | | Condition 1: 24 hours | Condition 2: 240 hours |
| Sample No. | Composition Type | Ba/Ti Ratio | P/Si Ratio | NG Rate (NG Number/ Test Number) | NG Rate (NG Number/ Test Number) |
|---|---|---|---|---|---|
| Ex. 1 | Ba—P—O | 1.22 | — | 0/80 | 8/400 |
| Ex. 2 | Ba—P—Si—O | 1.52 | 2.0 | 0/80 | 11/400 |
| Ex. 3 | Ba—P—Si—O | 1.59 | 3.1 | 0/80 | 0/400 |
| Ex. 4 | Ba—P—Si—O | 1.70 | 3.4 | 0/80 | 0/400 |

As shown in Table 1, in Comparative Example 1, a first segregation 21 was not present, and a sufficient durability was not obtained. Although segregations containing P were confirmed, in Comparative Example 2, the Ba/Ti ratio was less than 1.20, and a sufficient durability was not obtained. Meanwhile, in Examples 1-4 (first segregations 21 were present), the NG rate in the PCBT under Condition 1 was 0/80, and the durability for a high-temperature and high-humidity environment was further improved than in each Comparative Example.

In Examples 3 and 5, the NG rate in the PCBT under Condition 2 was 0/400, and the durability was particularly favorable. This result indicates that the P/Si ratio in the first segregations 21 is preferably 2.5 or less.

Experiment 2

In Experiment 2, capacitor samples according to Examples 11-14 were obtained by changing the average particle size of first segregations 21. The average particle size of the first segregations 21 was controlled by pulverization conditions in the preparation for the first-segregation powder. Except for the above, the experimental conditions in Experiment 2 were the same as those in Example 1 of Experiment 1, and the same evaluation as in Experiment 1 was performed. The evaluation results of Experiment 2 are shown in Table 2.

The results shown in Table 2 indicate that it was preferable for the first segregations 21 to have an average particle size of 0.05 μm or more and 0.50 μm or less.

Experiment 3

In Experiment 3, capacitor samples according to Examples 21-24 were manufactured by changing the content rate of first segregations 21 (the number N1 of first segregations 21 contained in a unit cross section of the ceramic layers 10). At this time, the number N1 in each Example was controlled by the addition amount of the first-segregation powder in the preparation for the dielectric paste. Except for the above, the experimental conditions in Experiment 3 were the same as those in Example 1 of Experiment 1.

In Experiment 3, the same evaluation as in Experiment 1 was performed, and a relative permittivity of each capacitor sample was also measured. The relative permittivity was calculated by measuring a capacitance using an LCR meter (manufactured by KEYSIGT ECHNOLOGIES: E4981A capacitance meter). Specifically, in the measurement of the capacitance, the measurement temperature was 20° C., and a signal having a frequency of 1 kHz and an input signal level (measurement voltage) of 1 Vrms was input to the capacitor samples. Then, the relative permittivity (no unit) was calculated based on the thickness of each dielectric layer, the effective electrode area, and the measured capacitance. The above-mentioned measurement was performed on 10 samples for each example, and an average value was calculated. In the present examples, a relative permittivity of 2500 or more was considered to be good. The evaluation results of Experiment 3 are shown in Table 3.

TABLE 2

| | Analysis Results of Segregation Phases | | | Evaluation Results of PCBT | |
| | | | Average | | |
| Sample No. | Composition Type | Ba/Ti Ratio | Particle Size μm | Condition 1: 24 hours NG Rate | Condition 2: 240 hours NG Rate |
|---|---|---|---|---|---|
| Ex. 11 | Ba—P—O | 1.45 | 0.04 | 0/80 | 3/400 |
| Ex. 12 | Ba—P—O | 1.30 | 0.07 | 0/80 | 0/400 |
| Ex. 13 | Ba—P—O | 1.92 | 0.46 | 0/80 | 0/400 |
| Ex. 14 | Ba—P—O | 1.51 | 0.62 | 0/80 | 2/400 |

TABLE 3

| Sample No. | First Segregations Composition Type | Ba/Ti Ratio | Content Rate N1 (pieces/$\mu m^2$) | Evaluation Results of PCBT Condition 1: 24 hours NG Rate | Condition 2: 240 hours NG Rate | Relative Permittivity |
|---|---|---|---|---|---|---|
| Ex. 21 | Ba—P—O | 1.40 | 0.0041 | 0/80 | 4/400 | 2649 |
| Ex. 22 | Ba—P—O | 1.90 | 0.0072 | 0/80 | 0/400 | 2634 |
| Ex. 23 | Ba—P—O | 1.85 | 0.39 | 0/80 | 0/400 | 2625 |
| Ex. 24 | Ba—P—O | 1.44 | 0.51 | 0/80 | 0/400 | 2383 |

The results shown in Table 3 indicate that the content rate of the first segregations 21 was preferably 0.007 pieces/$\mu m^2$ or more. Considering the influence on the relative permittivity by the segregation phases, the content rate of the first segregations 21 was preferably 0.4 pieces/$\mu m^2$ or less.

Experiment 4

In Experiment 4, a second-segregation powder was added to a dielectric paste, and capacitor samples according to Examples 31-38 were manufactured using the dielectric paste. Specifically, in Examples 31-34, a Dy—Si—O based composite oxide powder was used as the second-segregation powder. The composite oxide powder was produced by mixing and calcining a $Dy_2O_3$ powder and a $SiO_2$ powder. In Examples 31-34, an addition amount of the second-segregation powder in the preparation for the dielectric paste was changed, and N2/N1 was controlled by this addition amount.

In Examples 35-38, a Y–Si–O based composite oxide powder was used as the second-segregation powder. The composite oxide powder was produced by mixing and calcining an $Y_2O_3$ powder and a $SiO_2$ powder. In Examples 35-38, an addition amount of the second-segregation powder in the preparation for the dielectric paste was changed, and N2/N1 was controlled by this addition amount.

Except for the above, the experimental conditions in Experiment 4 were the same as those in Example 1 of Experiment 1, and the same evaluation as in Experiment 3 was performed. In the PCBT of Experiment 4, evaluations under Condition 3, which was stricter than Condition 2, were performed. Specifically, the exposure time of Condition 3 was 500 hours so as to evaluation the durability under conditions stricter than Condition 2. The evaluation results of Experiment 4 are shown in Table 4.

durability for a high-temperature and high-humidity environment. In particular, the content rate of the second segregations 22 was preferably controlled so that N2/N1 was 0.5 or more. Considering the influence of the segregation phases on the relative permittivity, the content rate of the second segregations 22 was preferably controlled so that N2/N1 was 10 or less.

DESCRIPTION OF THE REFERENCE NUMERICAL

2 . . . multilayer ceramic capacitor
4 . . . element body
4a . . . end surface
4b . . . side surface
10 . . . ceramic layer
12 . . . internal electrode layer
20 . . . dielectric particle
21 . . . first segregation
22 . . . second segregation
23 . . . grain boundary
6 . . . external electrode

What is claimed is:
1. A dielectric composition comprising:
dielectric particles each including a perovskite compound represented by $ABO_3$ as a main component; and
first segregations each including at least Ba, P, and O,
wherein a molar ratio (Ba/Ti) of Ba to Ti in the first segregations is 1.20 or more.
2. The dielectric composition according to claim 1, wherein a content rate of the first segregations is 0.007 pieces/$\mu m^2$ or more and 0.4 pieces/$\mu m^2$ or less.
3. The dielectric composition according to claim 1, wherein a molar ratio (P/Si) of P to Si in the first segregations is 2.5 or more.

TABLE 4

| Sample No. | First Segregations Composition Type | Ba/Ti Ratio | Content Rate N1 (pieces/$\mu m^2$) | Second Segregations Composition System | Content Rate N2/N1 (—) | Evaluation Results of PCBT Condition 2: 240 hours NG Rate | Condition 3: 500 hours NG Rate | Relative Permittivity |
|---|---|---|---|---|---|---|---|---|
| Ex. 31 | Ba—P—O | 1.81 | 0.09 | Dy—Si—O | 0.13 | 0/400 | 1/400 | 2603 |
| Ex. 32 | Ba—P—O | 1.64 | 0.06 | Dy—Si—O | 0.62 | 0/400 | 0/400 | 2571 |
| Ex. 33 | Ba—P—O | 1.53 | 0.03 | Dy—Si—O | 9.10 | 0/400 | 0/400 | 2572 |
| Ex. 34 | Ba—P—O | 1.43 | 0.03 | Dy—Si—O | 27.20 | 0/400 | 0/400 | 2201 |
| Ex. 35 | Ba—P—O | 1.45 | 0.08 | Y—Si—O | 0.46 | 0/400 | 3/400 | 2610 |
| Ex. 36 | Ba—P—O | 1.59 | 0.05 | Y—Si—O | 0.72 | 0/400 | 0/400 | 2676 |
| Ex. 37 | Ba—P—O | 1.27 | 0.05 | Y—Si—O | 8.80 | 0/400 | 0/400 | 2707 |
| Ex. 38 | Ba—P—O | 1.76 | 0.03 | Y—Si—O | 19.20 | 0/400 | 0/400 | 2166 |

The results shown in Table 4 indicate that the formation of the second segregations 22 together with the first segregations 21 in the ceramic layers 10 further improved the 4. The dielectric composition according to claim 1, wherein an average particle size of the first segregations is 0.05 $\mu m$ or more and 0.50 $\mu m$ or less.

5. The dielectric composition according to claim 1, further comprising second segregations each including at least Si, a rare earth element R, and O.

6. The dielectric composition according to claim 5, wherein the rare earth element R contained in the second segregations is Y and/or Dy.

7. The dielectric composition according to claim 5, wherein N2/N1 is 0.5 or more and 10 or less, where N1 is a content rate of the first segregations (unit: pieces/$\mu m^2$), and N2 is a content rate of the second segregations (unit: pieces/$\mu m^2$).

8. The dielectric composition according to claim 1, wherein the perovskite compound comprises barium titanate.

9. A multilayer ceramic electronic device comprising the dielectric composition according to claim 1.

* * * * *